United States Patent [19]
Kah, Jr.

[11] 3,924,652
[45] Dec. 9, 1975

[54] SEQUENCING VALVE

[76] Inventor: Carl L. C. Kah, Jr., 778 Lakeside Drive, North Palm Beach, Fla. 33408

[22] Filed: Mar. 6, 1975

[21] Appl. No.: 555,864

Related U.S. Application Data

[63] Continuation of Ser. No. 398,530, Sept. 18, 1973, abandoned.

[52] U.S. Cl. ...... 137/119; 137/624.13; 137/624.18; 137/625.11
[51] Int. Cl.² .......................................... F16K 21/00
[58] Field of Search.......... 137/119, 624.18, 625.11, 137/624.13, 624.15

[56] References Cited
UNITED STATES PATENTS

| | | | |
|---|---|---|---|
| 3,369,565 | 2/1968 | Haggard..................... | 137/624.18 X |
| 3,460,560 | 8/1969 | Kah............................ | 137/119 |
| 3,524,470 | 8/1970 | Kah............................ | 137/624.18 |
| 3,785,391 | 1/1974 | Miller......................... | 137/119 |

Primary Examiner—Alan Cohan
Attorney, Agent, or Firm—Jack N. McCarthy

[57] ABSTRACT

A pressure responsive sequencing valve including a housing having an inlet port and a plurality of outlet ports and a ported primary flow control valve located in said housing between said inlet and outlet ports and being mounted for reciprocation between seated and unseated positions and for step-by-step sequencing in rotary motion to place the valve port in register with a selected housing outlet port. An actuation piston is positioned in the housing between said inlet port and the primary valve and is operatively connected to said primary valve to sequence the primary valve in response to operating line pressure. The actuation piston is connected to a cam mechanism so as to cause the sequencing of the primary valve into register with a second outlet port in response to reciprocating motion of the actuation piston caused by line pressure variations and is operable so that positive actuation and sequencing are achieved before flow can pass through the valve.

6 Claims, 3 Drawing Figures

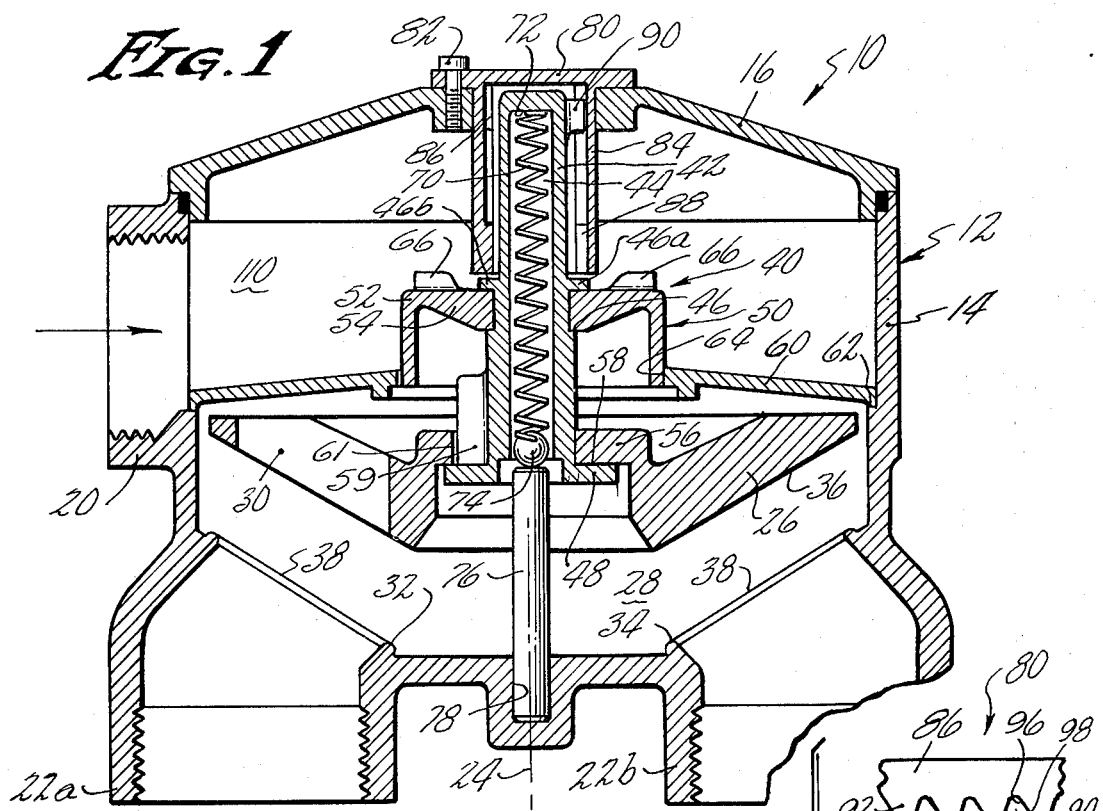
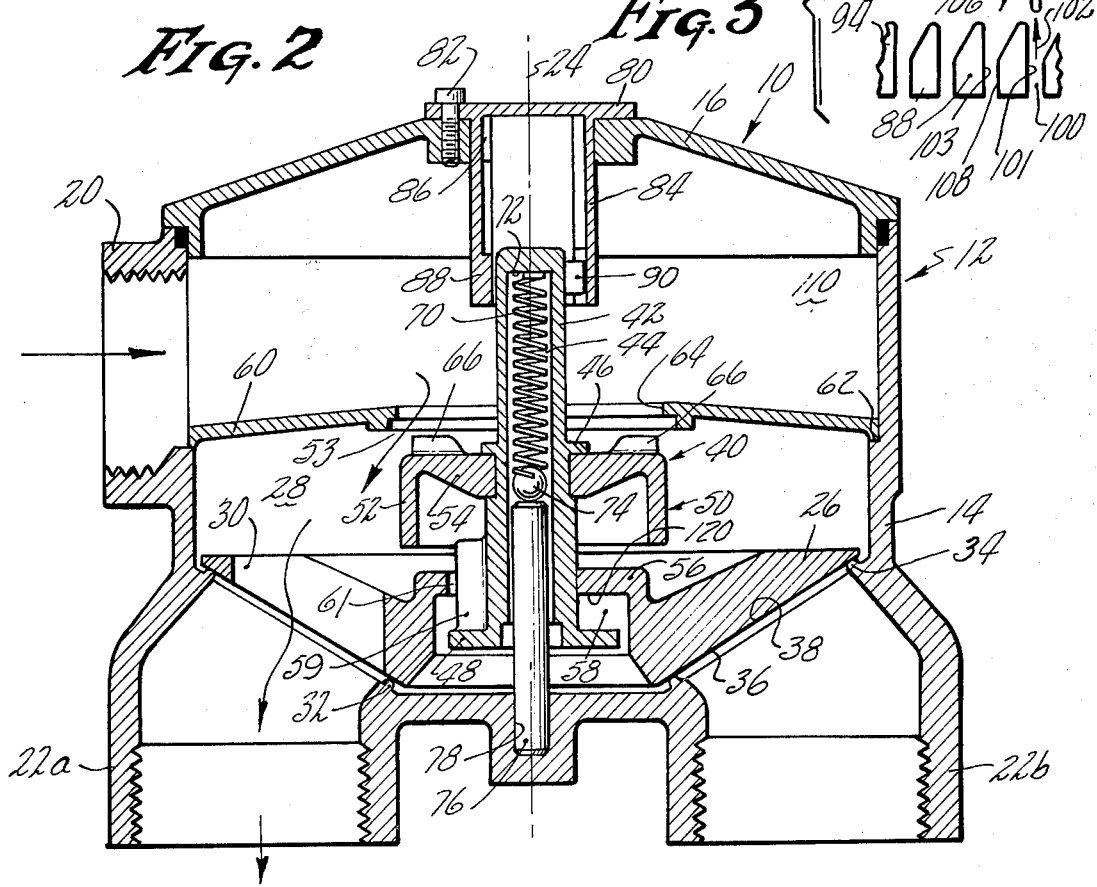

SEQUENCING VALVE

This is a continuation of application Ser. No. 398,530 filed Sept. 18, 1973, now abandoned.

BACKGROUND OF THE INVENTION

1. Field of the Invention

This invention relates to sequencing valving and more particularly to sequencing valving in which the primary flow control valve is actuated by a pressure responsive piston in the valve's flow path so as to produce a sequencing valve in which flow therethrough cannot commence until the primary valve sequencing function is completed, thus allowing the valve to operate effectively at lower flow rates. This is accomplished with a minimum number of valve component parts in a simple open flow design which allows maintenance access of the valve without having to remove the valve's inlet or outlet lines.

2. Description of the Prior Art

Typical prior art sequencing valves are shown in U.S. Pats. Nos. 2,666,450; 2,833,309; and 3,124,162 but these valves do not provide the sequencing of operation taught herein. U.S. Pats. Nos. 3,460,560 and 3,524,470 probably constitute the closest approach to the teaching herein, however, do not offer positive actuation and sequencing before flow can pass through the valve nor do they offer a fly back momentum unseating of the primary valving member.

SUMMARY OF THE INVENTION

A primary object of the present invention is to provide a sequencing valve which sequentially controls flow between the valve inlet and one or more of a plurality of valve outlets in response to line pressure variation and which operates well at low flow rate conditions.

It is an important feature of the present invention to provide a sequencing valve which completes its sequencing function before flow is permitted through the valve.

It is a further object of the present invention to provide such a sequencing valve in which access to all internal parts may be gained by removing the valve cover for ease of maintenance and repair without having to disconnect the valve inlet or outlet plumbing.

It is an important object of the present invention to teach a sequencing valve in which a primary flow control valve is actuated and sequentially controlled by a pressure responsive secondary member, such as a piston.

It is also an important object of this invention to teach a sequencing valve in which a lost motion connection is utilized between the primary flow control valve and the actuation piston, which controls the primary valve so that the primary valve may be fully sequenced and in its seated position before the actuation piston is moved to a position which permits line fluid flow thereto. Further, when line flow is terminated the primary valve is unseated with the benefit of the momentum force imparted thereto by the upwardly moving actuation piston, due to the lost motion connection.

It is still a further object of this present invention to teach a sequencing valve which is simple in construction, which functions properly with loose mechanical tolerances, which is insensitive to dirt and which is easy to maintain, wherein all major parts are preferably of circular cross section and positioned concentrically about an axis, wherein a single spring serves to bias the valve to its unseated position, and wherein the valve can be sequenced in response to a minimum line flow condition.

It is still a further object of this invention to teach such a sequencing valve in which the sequencing action is positive and in which line fluid flow therethrough cannot be established until valve sequencing and valve seating are completed, and further, wherein the sequencing valve is self flushing.

It is still a further object of this invention to teach such a sequencing valve in which cam action between the stationary and the movable part of the sequencing valve causes the valve to sequence in rotary motion in response to reciprocating motion of the valve movable parts.

It is still a further object of the present invention to teach such a sequencing valve in which the valve is concentric about an axis and wherein the valve outlet port seats form a slightly different angle with respect to the axis than the primary valve in the registering area so as to thereby provide an unseating force for the primary valve when operating pressure is removed from the valve due to the relief of the deformation required for the resilient primary valve to mate with the slightly different valve seat angle.

It is still a further object of the present invention to teach such a sequencing valve in which the actuation and sequencing of the primary valve member within its housing is controlled by a pressure responsive member positioned between the housing inlet and the primary valve member so as to be responsive to line pressure acting thereagainst to sequence the ported primary valves into register with the select outlet port and overcome the unseating spring bias so that the primary valve may be closed easily by the pressure in the valve housing.

It is still a further object of the present invention to teach such a sequencing valve in which the primary flow control valve is biased to its unseated position by a single spring member, wherein the inlet port for line fluid flow into the valve housing is tangentially disposed so as to coact with selectively shaped fins or vanes on the control piston member to assist in the rotation and hence sequencing thereof, and wherein the primary control valve includes one or more ports which may be sequenced in response to pressure variation to register with one or more housing outlet ports as desired by the operator.

BRIEF DESCRIPTION OF THE DRAWINGS

FIG. 1 is a cross-sectional showing of my sequencing valve in its unseated, no-flow position.

FIG. 2 is a cross-sectional showing of my sequencing valve in its seated position wherein flow is permitted therethrough between the valve inlet port and one or more of the valve outlet ports.

FIG. 3 is a developed view of my cam mechanism which causes my sequencing valve to move sequentially in rotation in response to valve reciprocation.

DESCRIPTION OF THE PREFERRED EMBODIMENT

Referring to FIGS. 1 and 2, we see the sequencing valve 10 in its unseated or no-flow condition in FIG. 1 and its seated or regulated flow position in FIG. 2. Valve 10 consists of housing 12 which includes body member 14 and closure or cover member 16 positioned thereon in cover fashion and attached thereto in any convenient manner such as by bolts 18. Body member 14 includes inlet port 20 and a plurality of outlet ports 22, which may be of any selected number depending upon the number of outlets desired but only two are depicted, 22a and 22b. Body member 14 and cover member 16 are preferably of circular cross section and concentric about axis 24. Inlet port 20 is preferably oriented so as to produce tangential inlet fluid flow for reasons to be explained hereinafter. Primary valve member 26 is positioned within the interior 28 of housing 12 and located between inlet port 20 and outlet ports 22. Valve member 26 includes at least one port 30 therein and is sized and shaped so that when valve 26 is in its FIG. 2 seated position, port 30 is in register with one of the outlet ports 22a while sealably engaging the remainder of the outlet ports, such as 22b, to block flow therethrough. Housing 12 is fabricated so that each outlet port includes a continuous raised bead element 32 and 34, which are preferably circular or oval in shape and which serve to provide a good sealing surface against which sealing surface 36 of valve 26 may sealably contact. The sealing surfaces 38 of outlet ports 22 and the sealing surface 36 of dish shaped primary valve 28 form an angle with axis 24. This angular relation is selected for best valve packaging. The angle may be increased to the vertical to reduce the valve housing diameter for a given outlet size. Also, going to a more vertical angle reduces the vertical component of pressure acting on the primary valve, making it easier for the actuator piston bias spring to lift the primary valve 26 off of the outlets 22 against small system residual pressures caused by terrain elevation differences between outlet lines. The sealing surface 36 of valve 26 is shaped to form a slightly different angle with axis 24 than the sealing surface 38 of the beads, such as 32 and 34 form with axis 24, so as to assist in the valve unseating operation. In particular, when the pressure differential across primary valve 26 is removed, the resiliency of valve 26, which is preferably made of rubber or like resilient material, will tend to return to its original shape thus exerting a force which acts to release it from complete sealing contact with housing bead sealing surface thus partially opening the outlet ports to allow any residual pressure differentials which might exist due to terrain elevation differences between outlet lines to adjust to the same pressures and thereby requiring lesser lifting force to lift primary valve 26 away from the outlet beads 32 and 34 of outlet port 22a and 22b.

Primary valve 26 is controlled by control mechanism 40, which includes stem member 42, having hollow interior 44 and connecting flange mechanisms 46 and 48, and which is mounted and guided for both reciprocating motion along and rotary motion about axis 24.

The actuator piston 50, which includes elongated skirt 52 and pressure responsive head portion 54, is supported on surface 46 of stem member 42 and may be locked in place by rotating piston 50 so that tangs 46a and 46b overhang it after the tangs are passed through slots (not shown) in piston head portion 54.

Flange 48 cooperates with central portion 56 of primary valve 26 to form lost motion connection 58 so that, as described in greater particularity hereinafter, primary valve 26 can be fully sequenced and in its FIG. 2 seated position while secondary control piston 50 is still in motion, and so that piston 50 can commence its motion from its FIG. 2 position back to its FIG. 1 position while primary valve 26 is still in its FIG. 2 seated position.

One or more keys 59 project from stem 42 and engage in mating slots 61 in primary valve 26 so as to cause valve 26 to rotate about axis 24 with stem 42.

Flow blockage member or cylinder member 60, which preferably sealably engages and is connected to the interior of housing 12 by a conventional means such as bolts 62, is positioned within the interior 28 of housing 12 and is located between inlet port 20 and primary valve 26 and includes a central aperture 64 which is sized to matingly receive elongated skirt 52 of the actuator piston 50 with a minimum clearance consistent with insensitivity to dirt clogging. Diametric clearance of 1/32 has been found to be suitably insensitive to dirt fouling consistent with minimal leakage. Since piston 50 moves clear of blockage member or cylinder 60 after valve 26 is sequenced and seated, accumulated dirt and any foreign matter in the fluid passing through the valve will pass through the valve. For this reason, minimum clearance may be maintained between piston 50 and member 60 to achieve minimal leakage with the valve in the FIG. 1 position. It will be noted that in defining port 64, member 60 acts as a conventional cylinder with respect to piston 50.

The actuator piston 50 preferably includes a plurality of selectively shaped fin members 66 projecting from the head 54 thereof so as to coact with tangential line fluid flow from tangential inlet port 20 to thereby assist in the rotation of piston 50 and its related mechanisms in control 40 about axis 24.

Stem 42 and hence control mechanism 40 is biased by spring 70 to its FIG. 1 position away from outlet ports 22. Spring 70 extends along axis 24 within the interior 44 of stem 42 and bears at one end against the inner surface 72 of stem 42 and bears at its other end against ball member 74, which is positioned with the stem 42 and bears against rod member 76, which is supported along axis 24 from housing 12 in any convenient fashion, such as a press fit into mating aperture 78 within housing 12.

My valve is caused to sequence in response to reciprocation of control mechanism 40 through the action of camming member 80 which is connected by bolt mechanism 82, or other convenient attachment means, to cover member 16 and includes sleeve member 84 which projects into the interior 28 of housing 12 concentrically about axis 24 and carries top cam ring 86 and bottom cam ring 88 therewithin. Cam rings 86 and 88 may be integral with sleeve 84. Lug 90 projects from the top of stem 42 and engages top cam ring 86 and bottom cam ring 88 in a fashion now to be described as control mechanism 40 reciprocates upwardly along axis 24 and then downwardly along axis 24 so as to cause control mechanism 40 and hence primary flow control valve 26 to rotate about axis 24 and sequence to its next position so that valve port 30 is in register with the next desired outlet port 22.

Referring to FIG. 3, we see the action of cam mechanism 80 in greater particularity. Both top cam ring 86 and bottom cam ring 88 are shown in FIG. 3 in more or less a developed view and it will be seen that top cam ring 86 includes a plurality of tooth members 92 projecting downwardly therefrom while bottom cam ring 88 includes a plurality of tooth members 94 projecting upwardly therefrom. Tab member 90, which is carried by stem 42 of control 40 (not shown in FIG. 3) moves into bottomless recess 100 when vale 26 is in its seated FIG. 2 position and when piston 50 of control 40 is fully open. Due to this construction, control 40 cannot prevent the seating of valve 26. When valve sequencing is desired, line pressure is reduced sufficiently that control 40 and valve 26 move toward their FIG. 1 position and tab 90 moves in the direction of arrow 102, until it contacts surface 96 of upper cam 86 and moves therealong, with the aid of rotational bias, in the direction of arrow 98 until it reaches the top of its reciprocating stroke when it contacts the base of teeth 92 in positive stop fashion, at which time by sequencing valve 10 is in its FIG. 1 unseated or no-flow position. It will be noted, however, that as lug 90 moves along surface 96, it was caused to rotated thereby about axis 24 so as to partially index aperture 30 of flow valve 26 to its next sequenced position. As tab 90 now commences to move along arrow 106, as my sequencing valve 10 moves from its FIG. 1 to its FIG. 2 position in response to line pressure increase, tab 90 will contact surface 103 of the next teeth 94 of the bottom cam ring 88 and travel therealong until it is engaged in bottomless vertical slot 108 so that piston 50 may open with respect to member 60 to allow flow therebetween as desired. It will therefore be seen that due to the vertical reciprocation of control mechanism 40, and hence tab 90, from its FIG. 2 to its FIG. 1 position, and then the vertical reciprocation of control 40, and hence tab 90, back to its FIG. 2 position, tab member 90 has moved in rotation from slot 100 in lower cam ring 88 to slot 108 in lower cam ring 88 thereby causing control member 40 and primary valve 26 to rotate therewith about axis 24 and index aperture 30 of valve 26 in sequence fashion to the next outlet port 22 of valve 10. It will be obvious that the shape of cam mechanism 80 can be controlled so as to sequence valve 10 in any desired fashion and without respect to the number of outlet ports 22 utilized. Cam member 80 may be of the type more fully disclosed in my U.S. Pat. No. 3,460,560 to which reference may be had.

OPERATION

Considering the operation of my sequencing valve 10, let us consider that the valve 10 is in its FIG. 1 unseated or no-flow condition. With the valve in this condition, line fluid flows through inlet port 20, preferably tangentially, into chamber 110 defined by cover 16, body member 14, blockage member 60 and secondary control piston 50. The pressure of the line fluid in chamber 110 will act upon the top surface or head 54 of piston 50, overcoming the biasing force of spring 70 and causing control piston 50 and hence all of control mechanism 40 to move from its FIG. 1 position toward its FIG. 2 position. Due to its own weight or the slightest piston flow-by once the lifting bias is removed from primary flow valve 26, it moves therewith toward the FIG. 2 position. Line fluid is acting upon fins 66 to assist in the rotation of piston 50 and hence all of the moving mechanisms of control 40 and valve 26 in rotation about axis 24 to assist in the indexing or sequencing of valve port 30. Skirt 52 is chosen to be of sufficient length that it remains in contact with mating aperture 64 of blockage disc 60 until the rotational sequencing of primary valve 26 is complete. Due to the lost motion connection 58 between control 40 and valve 26, control member 40 can continue to move toward its FIG. 2 position after primary flow control valve 26 is seated in its FIG. 2 position and, in fact, piston 50 does not come out of register with port 64 until flow valve 26 is fully indexed and seated so that a flow area is not established between piston 50 and aperture 64 until valve 26 is seated in its FIG. 2 position. With valve 26 so seated, lost motion connection 58 permits control member 40 to continue to move toward and eventually arrive at its FIG. 2 condition. With my sequencing valve 10 in its FIG. 2 position, line fluid can pass through the aperture defined between blockage member 60 and control piston 50 and then through valve port 30 and out of outlet port 22a for distribution as desired. When my sequencing valve 10 is in its FIG. 2 position, the pressure differential acting across piston 50 serves to retain it in the FIG. 2 position against the force of spring 70. With respect to primary valve 26, it will be noted that it is held in its seated position both by its own weight and by the pressure differential of the line fluid thereacross. For this valve sequencing actuation configuration, pressure drop is minimal since bias spring 70 needs only to be strong enough to return the actuator assembly 40 to the FIG. 1 position and partial sequencing. The actuator piston 50 provides whatever force is necessary for the primary sequencing due to pressure forces on the piston 50 before allowing flow past the piston 50. The piston pressure force must only overcome the light bias force of spring 70. This provides a minimum pressure drop for this configuration of sequencing valve.

When line pressure is reduced sufficiently as is done when the operator wishes to sequence valve 10, the fluid pressure in chamber 110 reduces sufficiently to permit spring 70 to commence to return control 40 from its FIG. 2 to its FIG. 1 position. Due to lost motion connection 58 flange 48 engages lips 56 of valving member 26 and lifts the valve off outlet beads 32 and 34 for sequencing it to the next outlet position. In addition, because this lost motion connection 58 permits control 40 to come into contact with surface 210 of valve 26 while control 40 is in motion, an added advantage of momentum force is imparted from control 40 to valve 26 to assist additionally in the unseating or lifting thereof. It will accordingly be noted that my sequencing valve 10 includes two important features which assist in the unseating of primary flow control valve 26, namely, the movement of control 40 imparts a momentum force to assist in the unseating of valve 26 due to lost motion connection 58 and the angular difference between seating surface 36 of valve 26 and the seating surface 38 of outlet ports seats 32–34. Eventually, the sequencing valve 10 returns to its FIG. 1 position wherein flow therethrough is blocked off and only minimal leakage occurs between small area piston 50 and member 60. The small size of piston 50 and aperture 64 of member 60 permit easy fabrication thereof with desired minimal clearance.

As valve 10 moves from its FIG. 2 to its FIG. 1 position in response to reduction in line pressure as just described, primary valve 26 will be partially indexed by the action of cam 80 as previously described. To complete the sequencing of valve 26, line pressure must now be increased to cause the sequence valve 10 to move from its FIG. 1 to its FIG. 2 position in the fashion previously described.

It should be noted, however, that an operator can therefore sequence valve 10 by first reducing the line pressure to bring valve 10 to its FIG. 1 position, and then increasing the line pressure to bring valve 10 to its FIG. 2 operable, flow or seated position. If it is desired to sequence valve 10 to additional outlet port, the operator will merely reduce and then increase line pressure once again, and repeat this cycling to effect the sequencing which he desires.

From the above description, it will be evident that control member 40 performs several functions in my sequencing valve 10, namely: (1) It controls the sequencing of valve 26, (2) It controls the seating and unseating of valve 26, and (3) It controls line fluid flow to the primary flow control valve 26.

It will accordingly be seen that my sequencing valve 10 is sensitive to line fluid pressure variation, will operate dependably in low pressure systems, requires minimum force to actuate the primary flow valve 26, and is constructed so that by the removal of cover member 18, and if desired, blockage member 60, access to the interior of sequence valve 10 is readily available and hence maintenance problems are minimal. Preferably, housing 12, control 40 and primary flow control valve 26 are of circular cross section and concentric about axis 24 for ease of manufacture and ease of maintenance. It should further be noted that due to the bolt connection 82 between cam mechanism 80 and cover 16, the cam mechanism may be removed with the cover 16 or separately as desired for maintenance or the substitution of a different camming element for sequencing to a different member of outlets if desired.

It should be borne in mind that while a single port 30 has been illustrated in primary flow control valve 26 it will be evident that any number of ports such as four could be used and brought into register with any selected number of housing outlet ports 22, and resequenced as desired.

I wish it to be understood that I do not desire to be limited to the exact details of construction shown and described, for obvious modifications will occur to a person skilled in the art.

I claim:

1. A sequencing valve automatically responsive to the application and reduction of a pressure comprising:
   A. a housing having an inlet port and a plurality of outlet ports,
   B. a valve means in said housing and positioned between said inlet port and said outlet ports and shaped to sealably engage each of said housing outlet ports when in its seated position and to have at least one port therein positioned to be in register with at least one of said housing outlet ports to permit flow therethrough while blocking flow through the remainder of the housing outlet ports when in said seated position,
   C. means for controlling said valve means for seating, unseating and rotational indexing motion in response to a pressure variation comprising:
      1. a support member mounted for reciprocating and rotational motion within said housing for cooperation with said valve means to cause seating, unseating and rotational indexing motion of the valve member therein,
      2. a pressure responsive piston member rigidly fixed to said support member,
      3. a member fixedly positioned in said housing between said inlet port and said valve means and shaped to define a selectively shaped and positioned aperture therein to sealably receive said piston member as said piston member reciprocates with said support member in response to pressure variations and to cooperate with said piston member to either block flow to said valve means or to define a flow port therebetween when out of register to permit flow therethrough to said piston member,
      4. cam means operatively connecting said support member and said housing and operative in response to support member reciprocation to cause said support member, said piston member, and said valve means to rotatably index to place said valve means port into register with a second housing outlet port in response to a pressure reduction and reapplication, and
   D. means for connecting said valve means control means to the valve means wherein said connecting means is a lost motion connection so that said valve member may move to its seated and indexed position before said piston member comes out of register with said aperture so as to permit flow therethrough and to the said valve means, and so that said support member and said piston member rigidly fixed thereto commence motion together to unseat said valve means while said valve means remains seated so that said support member and said piston member impart a momentum force to said valve means to unseat said valve means when the lost motion is dissipated.

2. A sequencing valve according to claim 1 wherein said cam means, said support member and said valve means are in vertical alignment with the cam member removably positioned over the support member and valve means.

3. A sequencing valve according to claim 1 wherein said support member has a longitudinal axis, said support member extending through said selectively shaped and positioned aperture, said cam means connecting the top of said support member above said piston member to the top of said housing by a camming action.

4. A sequencing valve according to claim 1 wherein said connecting means includes a flange means adjacent the bottom of said support member, said valve means being axially movable on said support member between said piston member on said support member and said flange means adjacent the bottom of said support member permitting said support member to move axially without moving said valve means.

5. A sequencing valve according to claim 1 wherein said housing outlet ports and said valve means are shaped to define slightly different angles with said housing at their area of register so as to assist in the unseating of the valve member during the valve sequencing operation.

6. A sequencing valve according to claim 3 wherein the bottom of said support member has an opening therein extending up into said support member along said longitudinal axis, a fixed shaft extending upwardly from the bottom of said housing, said shaft being aligned with said opening in said support member, spring means extending between the end of said shaft into said opening to the end thereof to provide the biasing force for urging the support member towards the top of said housing.

* * * * *